Jan. 2, 1968     J. N. HURST     3,361,337
IONIC WIND GENERATORS
Filed Aug. 6, 1965
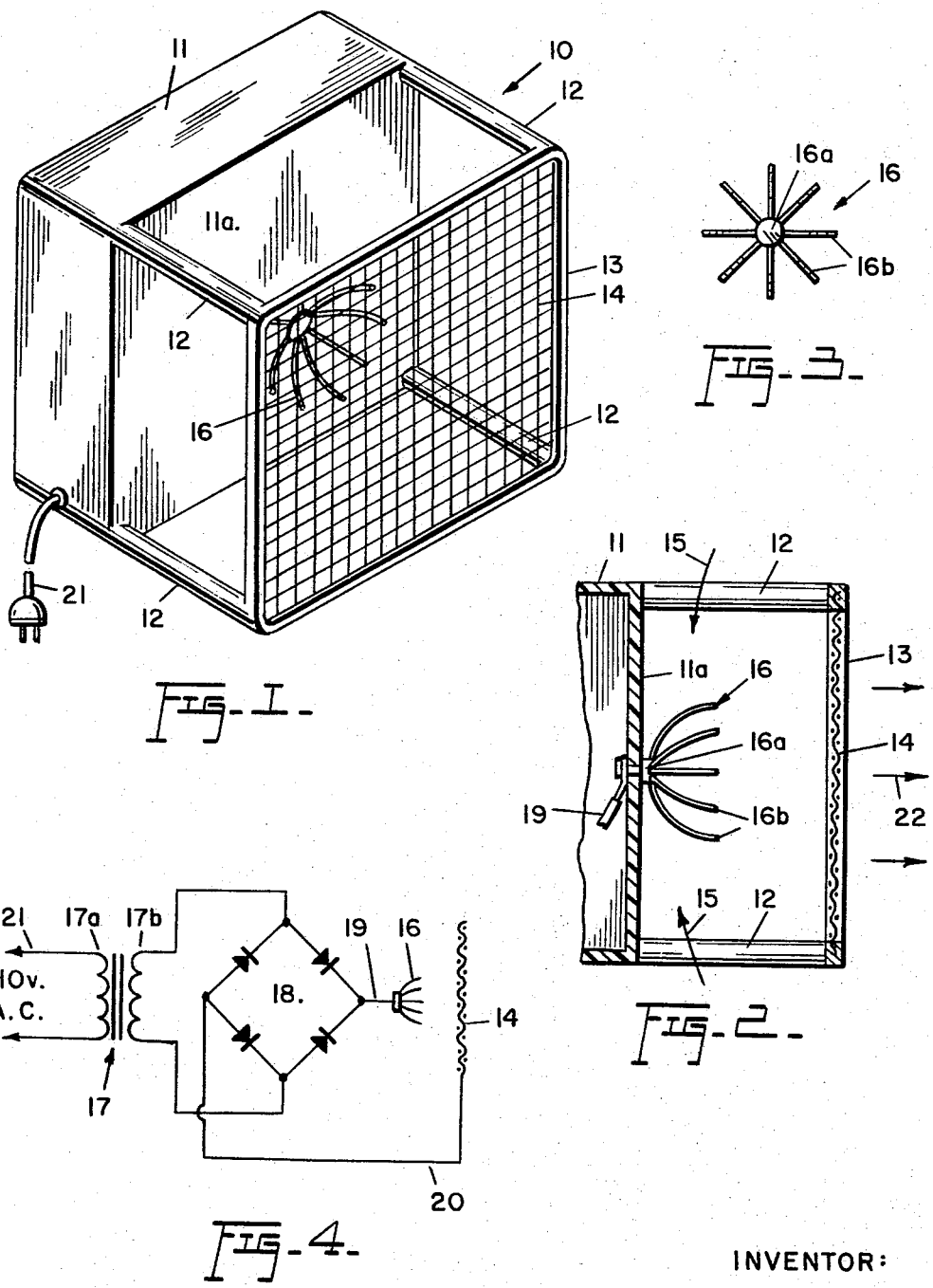
INVENTOR:
JAMES N. HURST
By: *Jerry B. Besak*

United States Patent Office

3,361,337
Patented Jan. 2, 1968

3,361,337
IONIC WIND GENERATORS
James N. Hurst, San Marcos, Tex. (7305 Boggess, Houston, Tex. 77016)
Filed Aug. 6, 1965, Ser. No. 477,837
1 Claim. (Cl. 230—1)

ABSTRACT OF THE DISCLOSURE

A portable type ionic wind generator having a box-shaped housing containing a step-up transformer and a rectifier to provide high voltage direct current. The housing has a front wall carrying an electrode and provided with forwardly projecting posts which support a mounting frame for a grid. The electrode and the grid are energized by the high voltage current to create an electrical field in which ions flow from the electrode to the grid, causing air to be drawn laterally inwardly through spaces between the posts and a wind flow forwardly through the grid.

---

This invention relates to new and useful improvements in apparatus for generating a flow of air for purposes of ventilation or the like, and in particular the invention concerns itself with what broadly may be referred to as a fan for generating ionic wind.

It is known that in a high voltage electrical field air molecules become ionized and the ions moving from one side of the field to the other exert a propelling force on neutral air molecules, thus creating a flow of air or wind.

The principal object of the invention is to embody the ionic wind phenomenon in a simple, highly efficient and practical fan which may be conveniently employed in homes as well as business or industrial establishments for generating a flow of air. As such, the device of the invention is compact in size, easily portable, silent in operation, and well adapted to economical manufacture. Unlike conventional electro-mechanical fans, the device of the invention has no moving parts or inherent frictional losses and requires no maintenance such as oiling, et cetera. Also, the device of the invention is capable of moving large volumes of air swifty and efficiently with the expenditure of relatively small amount of energy as compared to conventional electro-mechanical fans.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is an isometric view showing the ionic wind generator or fan of the invention;

FIGURE 2 is a fragmentary vertical sectional view thereof;

FIGURE 3 is a front elevational view of the discharge electrode per se; and

FIGURE 4 is a view schematically illustrating a portion of the ion generator together with the electrical circuitry therefor.

Referring now to the accompanying drawings in detail, the ionic wind generator or fan of the invention is designated generally by the reference numeral 10. The same is of a simple, compact and easily portable nature, so that it may be conveniently employed in homes, business or commercial establishments, or wherever creation of a flow of air is desired.

The generator or fan 10 comprises a housing 11 which may be conveniently made of plastic material, or the like, having good electrical insulating properties. The housing 11 has a front wall 11a which serves as a supporting plate for a plurality of post-like members 12 projecting forwardly from the front wall to support a frame 13. Preferably, although not necessarily so, the frame 13 and the supporting members 12 are formed integrally with the housing 11.

A foraminous metallic grid 14, such as a wire screen of aluminum or the like, is mounted in the frame 13 in forwardly spaced relation from the front wall 11a of the housing, it being noted that the post-like members 12 amply space the frame and the grid from the housing so as to afford free circulation of air into the space between the grid and the housing, as exemplified by the arrows 15.

A discharge electrode 16 is mounted centrally on the front face of the housing wall or plate 11a in rearwardly spaced relation from the grid 14. The electrode 16, which may conveniently be made of copper, or the like, comprises a central mounting boss 16a and a plurality of outwardly and forwardly radiating prongs 16b, although any other suitable electrode arrangement may be utilized.

The housing 11 contains a source of high voltage direct current on the order of several thousand volts and a current strength of a few milliamperes. Such current source may be conveniently provided by a step-up transformer 17 having a primary winding 17a and a secondary winding 17b, the latter being in circuit with a bridge diode rectifier 18 to provide a continuously flowing direct current of the required high voltage. One side of the rectifier 18 is connected to the discharge electrode 16 as by a conductor 19, while its other side is grounded to the grid 14 as by a conductor 20. The conductor 20 may extend from the housing 11 to the grid 14 either alongside or through one of the supporting members 12, as desired. The primary winding 17a of the transformer 17 is connected to an appliance cord 21 which extends outwardly from the housing 11 and may be plugged into any suitable electric outlet, such as for example 110 volts A.C.

When the device is in operation the discharge electrode 16 and the grid 14 become oppositely charged by the high voltage direct current, thus creating an electric field in which air molecules become ionized and the ions flow from the discharge electrode toward the grid. This ion flow exerts a propelling force on neutral air molecules in the space between the housing wall 11a and the grid 14, thus producing a wind or a current of air forwardly through the grid as indicated by the arrows 22, while the ions themselves are trapped by the grid and returned to the current source by the ground conductor 20.

It may be also noted that apart from its primary purpose of generating an air flow, the device of the invention will also purify the air by ionization and electrostatic deposition of smoke and dust particles on the grid 14.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A readily portable ionic wind generator, comprising in combination a box-shaped housing having a front wall and provided on said front wall with a plurality of mutually spaced and forwardly projecting posts, a frame carried by the forward ends of said posts, a metallic grid mounted in said frame in forwardly spaced relation to said housing front wall, an electrode mounted on said front wall between said posts and oriented toward said grid, a step-up transformer and a rectifier provided in said housing, and an attachment cord connected to the primary winding of said transformer and extending outwardly from the housing for connection to a source of alternating current, the secondary winding of said transformer being in circuit with said rectifier and said rectifier being in circuit with said electrode and with said grid, whereby to create an electrical field in which ions moving from the electrode to the grid may cause air to be drawn laterally inwardly through spaces between said posts and a wind flow forwardly through the grid.

References Cited

UNITED STATES PATENTS

| | | | |
|---|---|---|---|
| 2,182,751 | 12/1939 | Reitherman | 230—69 |
| 2,765,975 | 10/1956 | Lindenblad | 230—1 |
| 2,928,942 | 3/1960 | Hicks et al. | 230—1 X |
| 2,972,680 | 2/1961 | Hicks et al. | 230—1 X |
| 3,128,378 | 4/1964 | Allen et al. | 230—1 X |
| 3,212,442 | 10/1965 | Jorgenson et al. | 103—1 |

WILLIAM L. FREEH, *Examiner.*

DONLEY J. STOCKING, *Primary Examiner.*